United States Patent
Ventosa Rull et al.

(10) Patent No.: US 7,291,295 B2
(45) Date of Patent: Nov. 6, 2007

(54) METHOD FOR PRECIPITATING FINELY DIVIDED SOLID PARTICLES

(75) Inventors: Nora Ventosa Rull, Bellaterra (ES); Jaume Veciana Miro, Bellaterra (ES); Concepción Rovira Angulo, Bellaterra (ES); Santiago Sala Verges, Bellaterra (ES)

(73) Assignee: Sociedad Espanola de Carburos Metalicos, S.A., Barcelona (ES)

(*) Notice: Subject to any disclaimer, the term of this patent is extended or adjusted under 35 U.S.C. 154(b) by 0 days.

(21) Appl. No.: 10/111,501

(22) PCT Filed: Aug. 23, 2001

(86) PCT No.: PCT/ES01/00327

§ 371 (c)(1),
(2), (4) Date: Oct. 9, 2002

(87) PCT Pub. No.: WO02/16003

PCT Pub. Date: Feb. 28, 2002

(65) Prior Publication Data

US 2003/0098517 A1 May 29, 2003

(30) Foreign Application Priority Data

Aug. 25, 2000 (ES) .............................. 200002129

(51) Int. Cl.
*B29B 9/00* (2006.01)
*B01D 9/02* (2006.01)
(52) U.S. Cl. .............................. 264/5; 516/31; 516/77; 514/951; 514/630; 23/295 R
(58) Field of Classification Search .................. 516/31, 516/77; 514/951, 630; 23/295 R; 264/5, 264/517
See application file for complete search history.

(56) References Cited

U.S. PATENT DOCUMENTS

| 2,844,541 | A | * | 7/1958 | Work |
| 4,144,025 | A | * | 3/1979 | Swank |
| 4,452,621 | A | | 6/1984 | Fowles et al. ................. 62/534 |
| 4,507,244 | A | | 3/1985 | von Rappard et al. |
| 4,582,731 | A | | 4/1986 | Smith .......................... 427/421 |
| 4,710,519 | A | * | 12/1987 | Finnan et al. ............ 514/630 X |
| 4,829,064 | A | * | 5/1989 | Sunshine et al. ........ 514/630 X |
| 5,389,263 | A | * | 2/1995 | Gallagher et al. .......... 210/729 |

(Continued)

FOREIGN PATENT DOCUMENTS

EP  0 945 158 A1  9/1999

(Continued)

*Primary Examiner*—Daniel S. Metzmaier
(74) *Attorney, Agent, or Firm*—Finnegan, Henderson, Farabow, Garrett & Dunner, L.L.P.

(57) ABSTRACT

A method for precipitation of finely divided solid particles comprising
a) Dissolving a compound C in a fluid A to provide a solution A;
b) Thermostatization of said solution A to a temperature ranging between −50°0 C. and 200° C.;
c) Adding a fluid B to said solution A until a pressure P is obtained, characterized in that said fluid B at a pressure P is miscible with said solution A and acts as a co-solvent to form a solution AB;
d) Adding an inert gas to solution AB so as to maintain the pressure P; and
e) Reducing the pressure of said solution AB so as to produce the precipitation of said compound C, and wherein the method permits particles of average size less than 20 μm, with a narrow distribution ranging between 1 and 100 μm, from a solution, and not a mix, that contains the compound C precipitated.

10 Claims, 12 Drawing Sheets

U.S. PATENT DOCUMENTS

| | | | |
|---|---|---|---|
| 5,639,441 A | 6/1997 | Sievers et al. | 424/9.3 |
| 6,056,791 A * | 5/2000 | Weidner et al. | 23/295 R |
| 6,197,836 B1 * | 3/2001 | Riede et al. | 516/31 |
| 6,364,914 B1 * | 4/2002 | Ueda et al. | 23/295 R |
| 6,461,642 B1 * | 10/2002 | Bisrat et al. | 514/951 X |
| 2001/0055561 A1 * | 12/2001 | Saim et al. | 423/658.5 |

FOREIGN PATENT DOCUMENTS

| | | | |
|---|---|---|---|
| ES | 2 109 095 | | 1/1998 |
| WO | WO90/03782 | | 4/1990 |
| WO | WO 96/00610 | * | 1/1996 |
| WO | WO 00/29096 | * | 5/2000 |

* cited by examiner

METHOD FOR PRECIPITATING FINELY DIVIDED SOLID PARTICLES

This application is a 371 of PCT/ES01/00327 filed Aug. 23, 2001.

FIELD OF THE INVENTION

This invention relates to a method for precipitating finely divided solid particles. In particular, this invention relates to a new procedure that allows particles of average size less than 20 μm to be obtained, with a narrow size distribution ranging between 1 and 100 μm, generally between 1 and 20 μm, from a solution, and not a mixture, that contains the compound to be precipitated.

BACKGROUND OF THE INVENTION

The quality of a large number of industrial products (medicines, explosives, colorants, pigments, cosmetics, polymers, catalysts, chemical products for agriculture, etc.) depends on the physical characteristics (measurement, size distribution, homogeneity, morphology, etc.) of the particles making them up. In conventional manufacturing processes finely divided particles are obtained by means of a sequence of production stages: crystallization or precipitation, drying, triturating or grinding, and homogenisation. Implementing any of these stages can be very costly for compounds that are unstable at high temperature or which undergo degradation when subjected to mechanical action. The development of methods for obtaining finely divided particles in a single production step is thus of considerable technological interest.

There exist in the state of the art various methods that relate to obtaining finely divided solid particles.

On one hand, there are methods which use solutions under pressure. Notable amongst the most widely used of such methods is that described in the U.S. Pat. No. 4,582,731, known as the RESS Procedure, and the method described in international patent WO 9003782, known as the GAS Procedure.

On the other hand, there are methods in which cooling of the solution to be crystallized is caused by the evaporation of a volatile fluid. Notable among the most widely used are the methods described in U.S. Pat. Nos. 4,452,621 and 5,639,441, known as the DCC Procedure.

There follows a brief description of the mechanism used in each one of the procedures mentioned to obtain finely divided particles.

Firstly, in the RESS (Rapid Expansion of a Supercritical Solution) Procedure the solid to be precipitated is first dissolved in a fluid at a pressure and temperature higher than the critical temperature and pressure. This supercritical solution is then expanded rapidly at atmospheric pressure, with the resulting precipitation of micrometric particles.

In this method, supersaturation of the compound in the solution to be precipitated is due to the rapid fall in the solvating power of the supercritical gas caused by the sudden reduction of pressure.

Secondly, in the GAS (GAS Anti-Solvent) procedure, the gas or fluid under pressure acts as an anti-solvent on a liquid solution of a compound C to be precipitated. Initially, said compound to be precipitated is dissolved in a fluid A in order to form a solution A, and the solution A is then mixed at a pressure P, with a second fluid B, for example $CO_2$, which is converted into a gas when the pressure is reduced to atmospheric pressure. In this method the fluid A and the fluid B have to be totally miscible at the pressure P. In the GAS procedure, however, the fluid B acts as an anti-solvent, and precipitation of the compound C takes place during mixture of the solution A with the fluid B, at pressure P and temperature T.

Thirdly, there exists a method in which the cooling of the solution to be crystallized is caused by the evaporation of a volatile fluid, which is known as the DCC Procedure.

In a DCC (Direct Contact Cooling) procedure, the evaporation of a volatile fluid (refrigerant) is used to provide the coldness necessary to permit precipitation. In this case, the degree of homogeneity of supersaturation throughout the entire solution to be crystallized depends of the quality of mixing between the solution and the refrigerant liquid. The better the mixture the more homogenous the cooling will be, and the narrower the distribution of particle size obtained.

In this crystallization process the solvent in which the compound to be precipitated is dissolved and the refrigerant fluid are not miscible and, therefore, a solution is not formed before precipitation. In this case, moreover, the solution A and the fluid B come into contact once the fluid B has been depressurised.

One major difference that should be highlighted between the methods of the prior art and that of this application is that precipitation of the compound of interest takes place using a mixture and not using a solution that contains the compound to be precipitated, as is the case in this invention.

DESCRIPTION OF THE INVENTION

A first objective of this invention is to provide a new method for obtaining finely divided solid particles, and therefore particles with a large surface area, which is of considerable technological interest. The method of the invention permits finely divided solid particles to be obtained from a solution that contains the compound to be precipitated. In the prior art, on the other hand, small-size particles are obtained from a mixture which contains the compound to be precipitated.

A second objective of the invention is to provide a method which permits solid particles of an average size of less than 20 μm, and usually less than 10 μm, to be obtained, with a narrow distribution of size of between 1 and 100 μm, usually between 1 and 20 μm.

A third objective of the invention is to provide a method useful for providing finely divided solid particles of a large number of industrial products such as drugs, explosives, colorants, pigments, cosmetics, polymers, catalysts, chemical products for agriculture, etc., which are difficult to make using other procedures existing in the state of the art or which, in some cases, do not allow the production of average particle sizes of less than 20 μm, and usually less than 10 μm, with a narrow size distribution ranging between 1 and 100 μm, and usually between 1 and 20 μm.

A fourth objective of the invention is to disclose a method for providing finely divided solid particles at low cost.

DETAILED DESCRIPTION OF THE INVENTION

In order to attain the objectives of this invention, the method for obtaining finely divided solid particles includes the following stages:

a) Dissolving a compound C in a fluid A in order to provide a solution A;

b) Thermostatization of said solution at a temperature ranging between −50° C. and 200° C.

c) Adding a fluid B to solution A until a pressure P is obtained.

And it is characterized in that said fluid B is miscible with said solution A and acts as a co-solvent in forming a solution AB, so that no precipitation at all takes place; and then d) Reducing the pressure of the solution AB so as to produce a high and homogeneous supersaturation of the solution AB and resulting the precipitation of particles of said compound C.

The solid particles thus obtained present a narrow distribution of size and an average diameter of less than 20 µm, and usually less than 10 µm.

The faster the speed of depressurisation of the solution AB in stage d), the smaller will be the particle size obtained and, therefore, the larger the surface area. This depressurisation causes an intense evaporation of the fluid B and the consequent fast drop in temperature, which causes the supersaturation of the solution AB and precipitation of particles of the compound C dissolved in said solution AB.

Advantageously, and unlike the RESS procedure of the prior art, in the method of this invention the supersaturation, necessary for the precipitation to take place, occurs due to the fast and homogeneous fall in the temperature of the solution AB which includes the compound C to be precipitated. This fall down in temperature takes place homogeneously throughout the solution, since this is a solution and not a mixture, owing to depressurisation of the solution AB, initially at a pressure P. During this depressurisation the fluid B is evaporated by boiling cooling the solution AB and causing precipitation of the compound C.

Unlike in the GAS procedure, in the method of the invention the precipitation does not take place during the mixing, at pressure P of the solution A with the fluid B. In the method of the invention, the fluid B does not act as an anti-solvent, but rather as a co-solvent to form a new solution AB of the compound C at pressure P. Precipitation takes place when the pressure of the solution AB is reduced suddenly as a result of the cooling caused by evaporation of the fluid B. With the method of the invention particles of average size of less than 20 µm, and usually less than 10 µm, can be obtained, with a narrow size distribution ranging between 1 and 100 µm, and usually between 1 and 20 µm.

As regards the differences between the method of the invention and the DCC procedure, it should be stressed that although evaporation of a volatile fluid is also used to provide the coldness necessary for the precipitation to take place, but unlike in the DCC process, in the invention the fluid B is dissolved at a pressure P in the solution A which contains the compound C to be precipitated in order to form a new solution AB before evaporation and the consequent precipitation of the compound C take place.

Thus, in the procedure of the invention, when the pressure is reduced and the fluid B evaporates, a very high degree of homogeneity is achieved in the cooling due to the fact that said depressurisation takes place in a solution AB.

Moreover, with the method of the invention a high degree of supersaturation of the solution is obtained, which permits the precipitation of particles of 0.1 to 10 µm with a very narrow size distribution. (See FIG. 1, which shows two supersaturation curves in relation to time. With the method of the invention a high and homogeneous supersaturation (curve a) is achieved at all points of the solution and, therefore, during crystallization the nucleation process is enhanced more than crystalline growth, providing small particles with a very narrow size distribution. In the prior art (curve b), for example in the DCC process, there is a mixture of the solution A and the fluid B and, therefore, the trend in the crystallization curve and the size and distribution of the particles will depend on the quality of the mixing (shaking speed, design of the shaking apparatus, etc. of the solution A with the refrigerant fluid)).

In this invention:

Compound C is taken to be an industrial product selected from a drug, explosive, colorant, pigment, cosmetic, polymer, catalyst, a chemical product for agriculture or other product that may be obtained in finely divided solid particle form.

Fluid A is taken to mean any polar or non-polar solvent of the compound C, whether it be water or an organic solvent or mixtures of organic solvents that are also miscible with the fluid B. Amongst the most widely used are acetone, methanol, ethanol, ethyl acetate, toluene or mixtures thereof.

Fluid B is taken to be any fluid, liquid or supercritical, for example $CO_2$, ethane, propane, which, one the one hand, behaves as such at a process pressure P and temperature T and is also a gas at the discharge pressure and temperature, normally atmospheric pressure and room temperature. And, on the other hand, said fluid B is miscible with the fluid A and the solution A or only with the solution A, at a process pressure P and temperature T, so as to provide a solution AB.

Moreover, in order that the method of the invention for obtaining finely divided particles can be carried out, the solubility response of the compound C in mixtures of fluid A and fluid B, at pressure P and temperature T, must approximate to a mathematical function, for example of the "asymmetric sigmoid" type, which is shown below:

$$S = \frac{\alpha}{\left[1 + \exp\left[-\frac{X_B - \gamma\ln(2^{1/\delta} - 1) - \beta}{\gamma}\right]\right]^\delta} \quad \text{Equation 1}$$

In which S is the solubility of the compound C, expressed in moles of C per moles of solvent, and $X_B$ is the molar fraction of fluid B in the solvent (fluid A plus fluid B), that is, $X_B$=moles B/(moles B+moles A), at a pressure P and a temperature T which are shown in FIG. 3 attached.

The coefficients $\alpha$, $\beta$, $\gamma$ and $\delta$ of equation 1 describe the variation of S with respect to $X_B$, where $X_B$ is a value between 0 and 1.

The yield of the method of the invention depends on the solubility behaviour of the compound C in mixtures of fluid A and fluid B at a pressure P and a temperature T, and therefore of the coefficients $\alpha$, $\beta$, $\gamma$ and $\delta$.

Advantageously, there is a suitable solubility curve when $\beta > 0.3$ and $\alpha \approx ([C_S]^A - [C_S]^B)$, with $[C_S]^A$ being the saturation concentration of the compound C in the pure fluid A and $[C_S]^B$ being the saturation concentration of the compound C in the pure fluid B.

When the coefficient $\beta < 0.01$ the requirements for carrying out the method in accordance with the invention are not fulfilled. For values of $\beta$ between 0.01 and 0.3 the viability of the method depends principally on the values of coefficient $\gamma$, being preferable for absolute values of $\gamma$ close to 0, and preferably lower than an absolute value of 0.3.

Furthermore, the solubility behaviour of the compound C in the solvent mixture does not depend on the value of the coefficient $\delta$, as can be seen from Table 1 which is included in the detailed description part of the figures.

It should be stressed that, although the function which describes the solubility of a compound C in a mixture of solvent has been approximated to a function of the "asymmetric sigmoid" type, it is obvious that said approximation can be carried out with other mathematical functions that can be approximated to the solubility function which permits the method of the invention to be carried out.

The evolution of the composition of the compound C-fluid A-fluid B system, at pressure P and temperature T, is shown by a straight line whose slope is:

$-[C]^A$, where $[C]^A$ is the concentration of the compound C in the fluid A and ordinate at the origin $[C]^A$.

The intersection of said straight line with equation 1 must arise at a value of $X_B > 0.2$, preferably $X_B > 0.4$, where $X_B$ is the molar fraction of fluid B in the solvent mixture (fluid A+fluid B). From $X_B > 0.2$ good performance is achieved in precipitation of the compound C. See FIG. 3.

Advantageously, in order to maintain the conditions of pressure P and temperature T within the reactor before carrying out stage d) of depressurisation, an inert gas is supplied in the mixing reactor.

In this invention, inert gas is taken to mean any gas that does not interfere with the solubility between the compound C and fluid A and fluid B and does not modify their chemical composition. Notable among the most widely used are nitrogen, helium and argon.

This invention provides a method for obtaining particles of an average size smaller than 10 μm and a very narrow size distribution. See FIGS. 8 and 11.

Advantageously, and in accordance with the method of the invention, the making of a solution AB permits the cooling of said solution AB to be carried out by depressurisation in a wholly homogeneous way, that is, almost at molecular level. This promotes a high degree of nucleation compared with the crystalline growth with which particles of average size less than 20 μm, and generally less than 10 μm are obtained, in addition to a narrow distribution of particle size. See FIG. 1 on the crystallization curve.

With the procedures described in the prior art it is not possible to obtain the high degree of nucleation that is obtained with the method of the invention, since it is a solution and not a mixture. In the methods of the prior art the cooling of the mixture that contains the compound to be precipitated arises through evaporation of a fluid which is in more or less close contact with the mixture that contains said compound to be precipitated. There has nevertheless been no description or suggestion that the evaporation of the fluid that permits the cooling of the solution is miscible with solution A, in such a way that a new solution AB is formed. In the prior art, before depressurising in order to cool the mixture two phases exist even where mechanical means have been used, such as shaking, that bring both phases into intimate contact, and therefore the refrigerating effect that can cause evaporation of one of these phases cannot be compared with the refrigerating effect caused by evaporation of the fluid B dissolved in the solution AB.

Also included below are the figures corresponding to the examples of this invention.

FIGS. 5, 6, 7, 9 and 12 show the curves of variation of the solubility in moles of compound C/moles of solvent (fluid A+fluid B) with the molar fraction of fluid B in the solvent.

Figure 8:
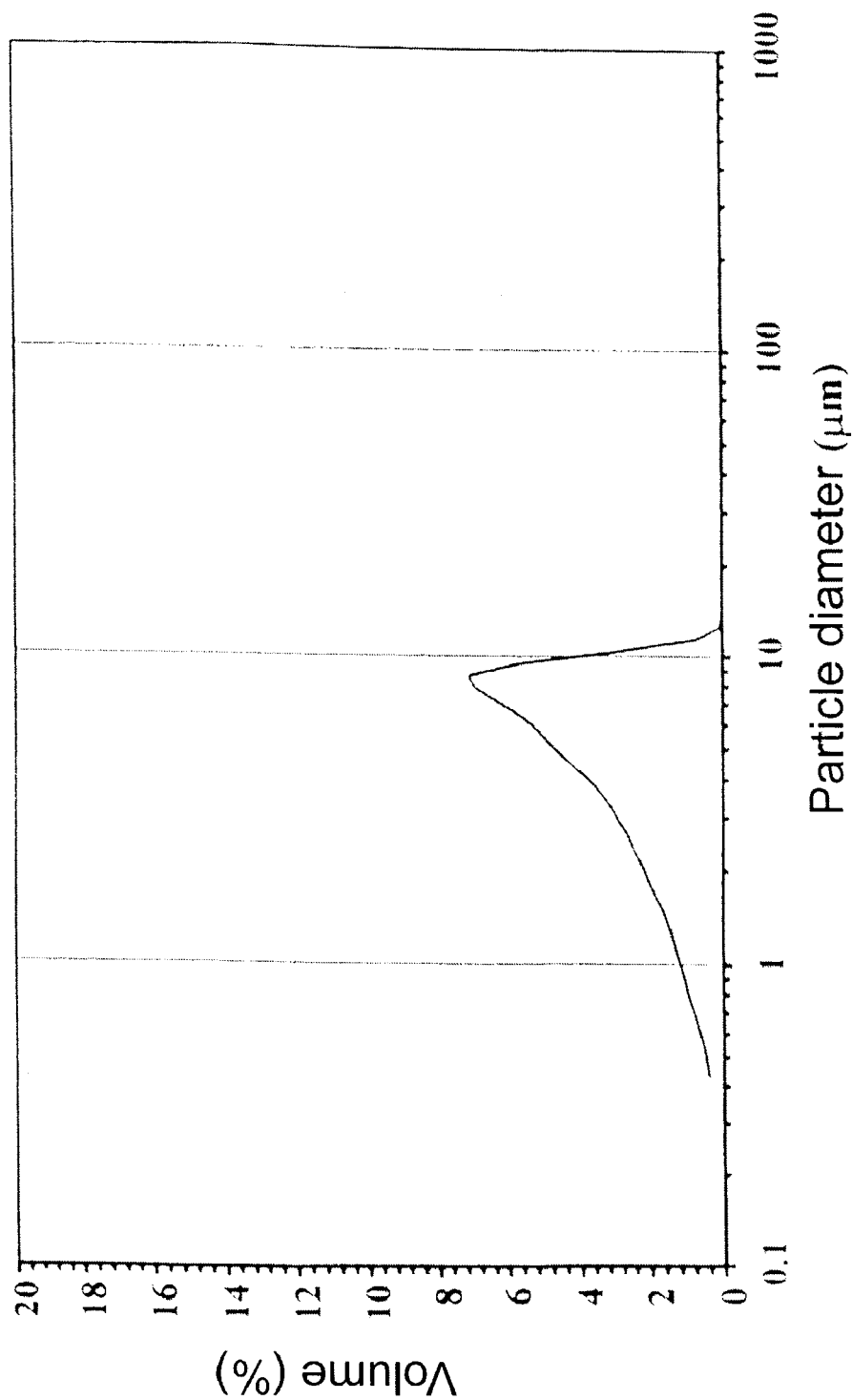
Figure 10:
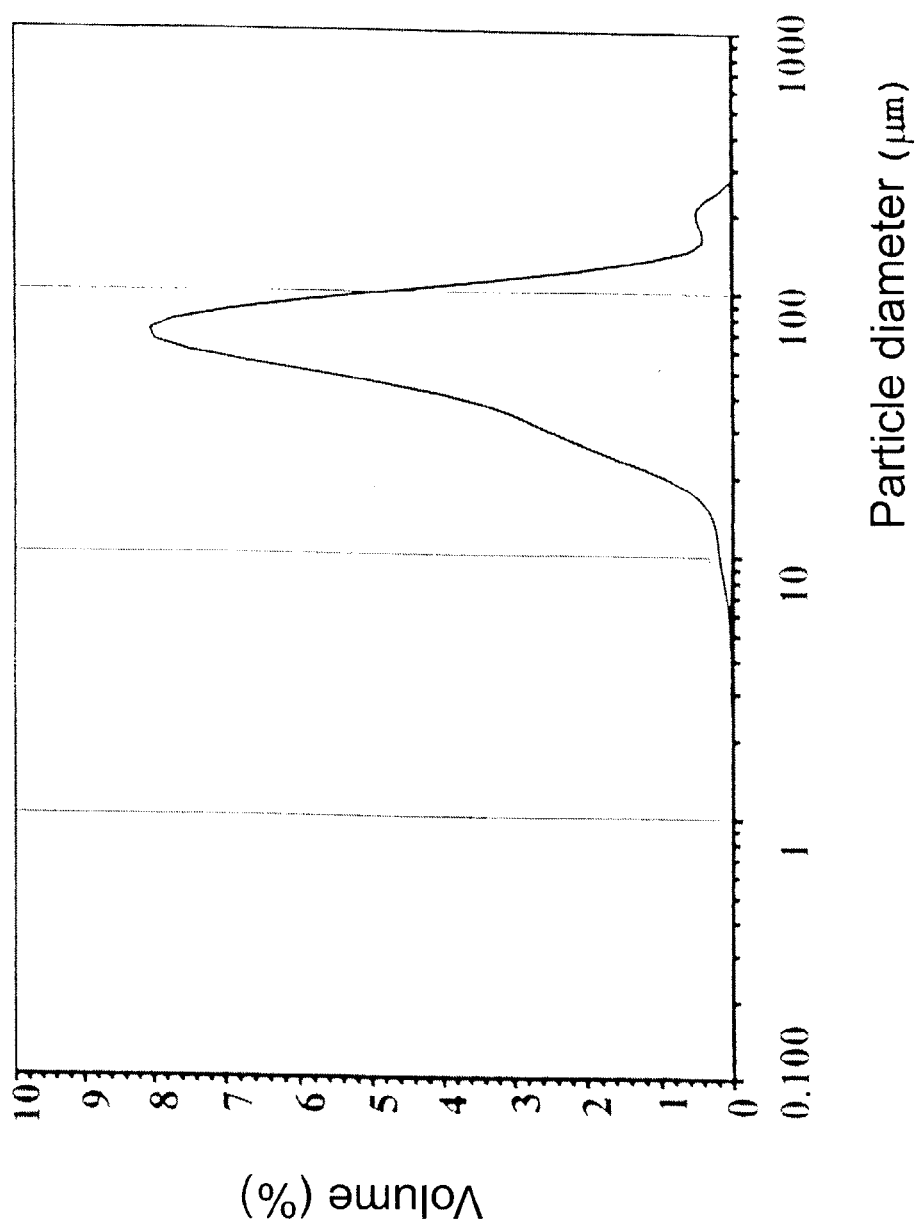
Figure 11:
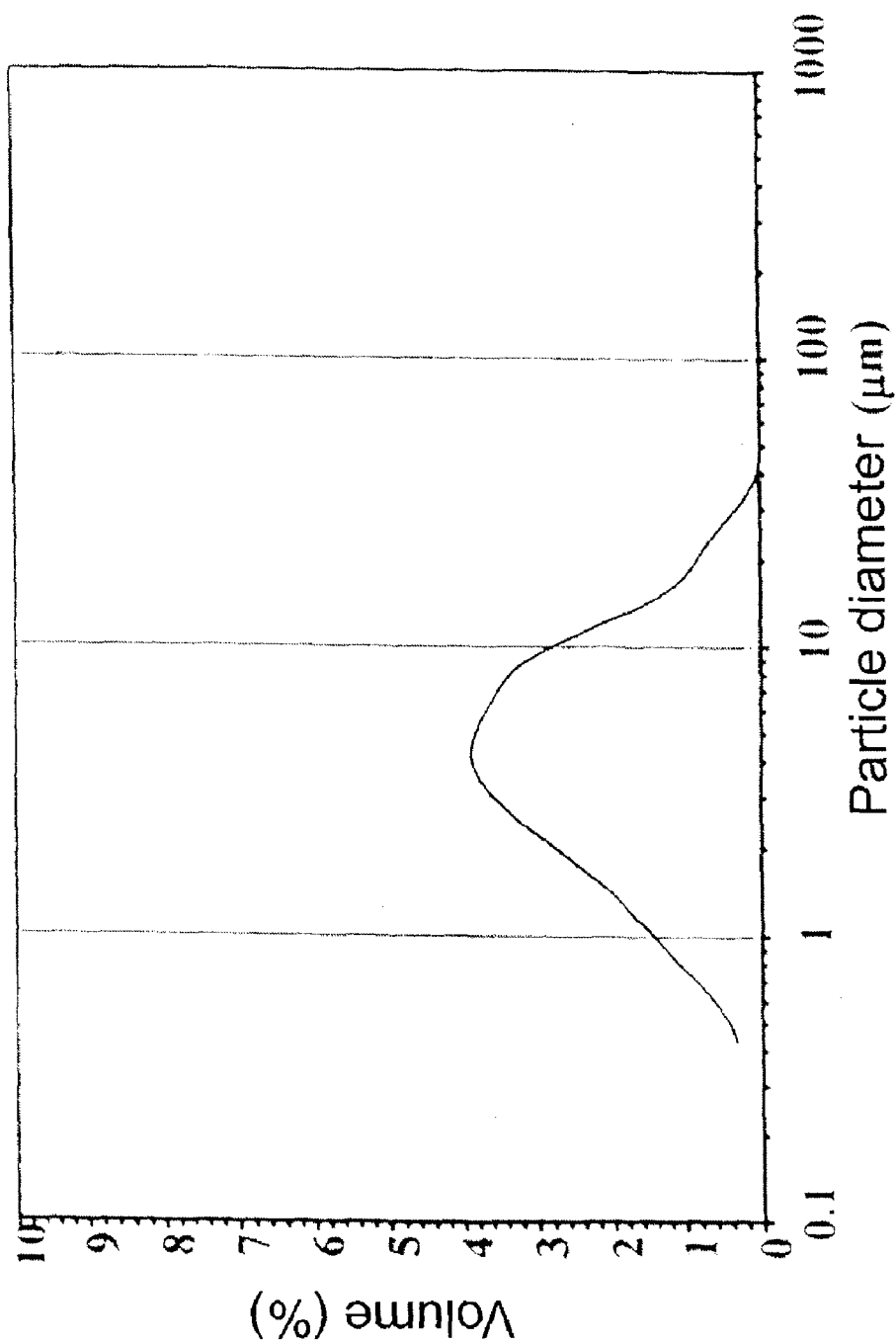

FIGS. 8, 10 and 11 show the distribution of size of the particles using the Coulter technique using light dispersion.

The geometrical characteristics of the particles of precipitate (size and distribution of sizes) are measured by the Coulter technique that uses light dispersion with Fourier lenses. Thus, by "particle size" is meant the value of the median of the curve of distribution of particles, in % in volume, and by "distribution of sizes" is meant the value of the standard deviation from the same curve.

DETAILED DESCRIPTION OF THE FIGURES

Figure 1:
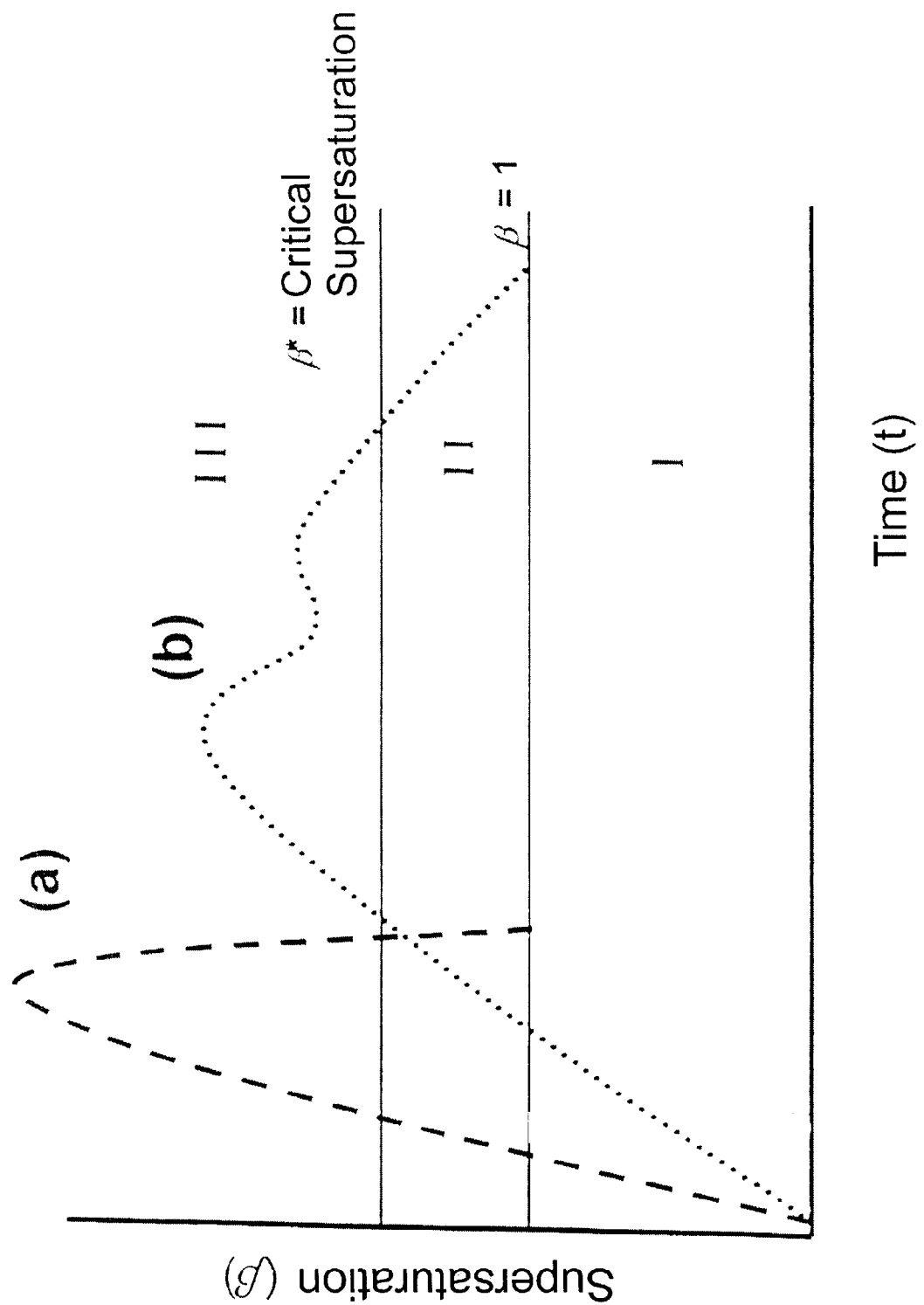
FIG. 1 shows two supersaturation curves in relation to time.

FIG. 1 shows two supersaturation curves in relation to time (t).

Said FIG. 1 presents three differentiated zones: zone I in which there is no crystalline growth; zone II in which there is crystalline growth but not nucleation; and zone III in which there is nucleation.

Figure 2:
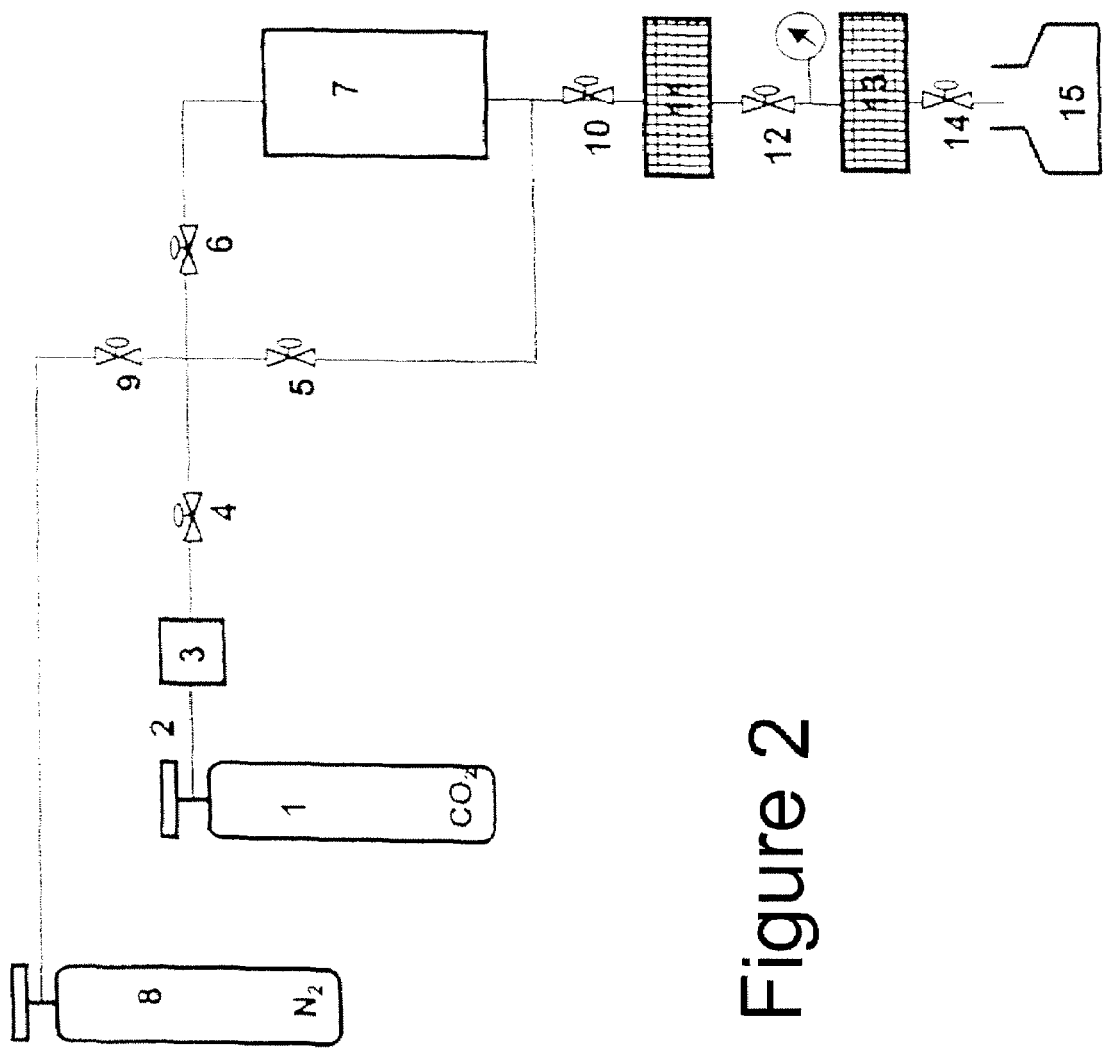
FIG. 2 provides a schematic representation of an installation for carrying out the method of the invention.

From FIG. 1 it can be observed that in accordance with the method of the invention (curve a), said supersaturation curve develops in zone III over a brief period of time, and so there exists a high nucleation. Moreover, according to the method of the invention there is little crystalline growth, zone II, when compared with the crystalline growth which takes place according to the procedures of the prior art, and therefore a high number of solid particles FIG. 2 shows a schematic representation of an installation for carrying out the method of the invention which allows particles with a very narrow size distribution to be obtained, of a size less than 20 μm, and generally less than 10 μm.

The equipment includes a tank 1 which contains the fluid B, connected through the pipe 2 to a pump 3 which delivers the fluid B at high pressure. Addition of the fluid B in the mixing reactor 7, in which solution A (compound C and fluid A) is situated, can be carried out through the upper part, through valves 4 and 6, or through the lower part through valves 4 and 5. The addition to the mixing reactor 7 of an inert gas which is in a tank 8 is controlled through valve 9. The solution at pressure P, that had been prepared in the reactor 7, passes to the filter 11 through the valve 10, where a first filtering at pressure P is implemented through the filter 11.

This filter is not necessary for carrying out the method of the invention, since no precipitation of compound C takes place in the reactor mixture. It can nevertheless be useful to fit such a filter in order to eliminate possible solid residue in the subsequent filtering.

At the outlet from the filter 11 and after passing through the valve 12, the solution undergoes a rapid reduction of pressure down to atmospheric pressure, with the consequent precipitation of particles. During the filtering at atmospheric pressure, these particles are retained on the filter 13 and the mother liquor is channelled to the tank 15 through the valve 14.

Figure 3:
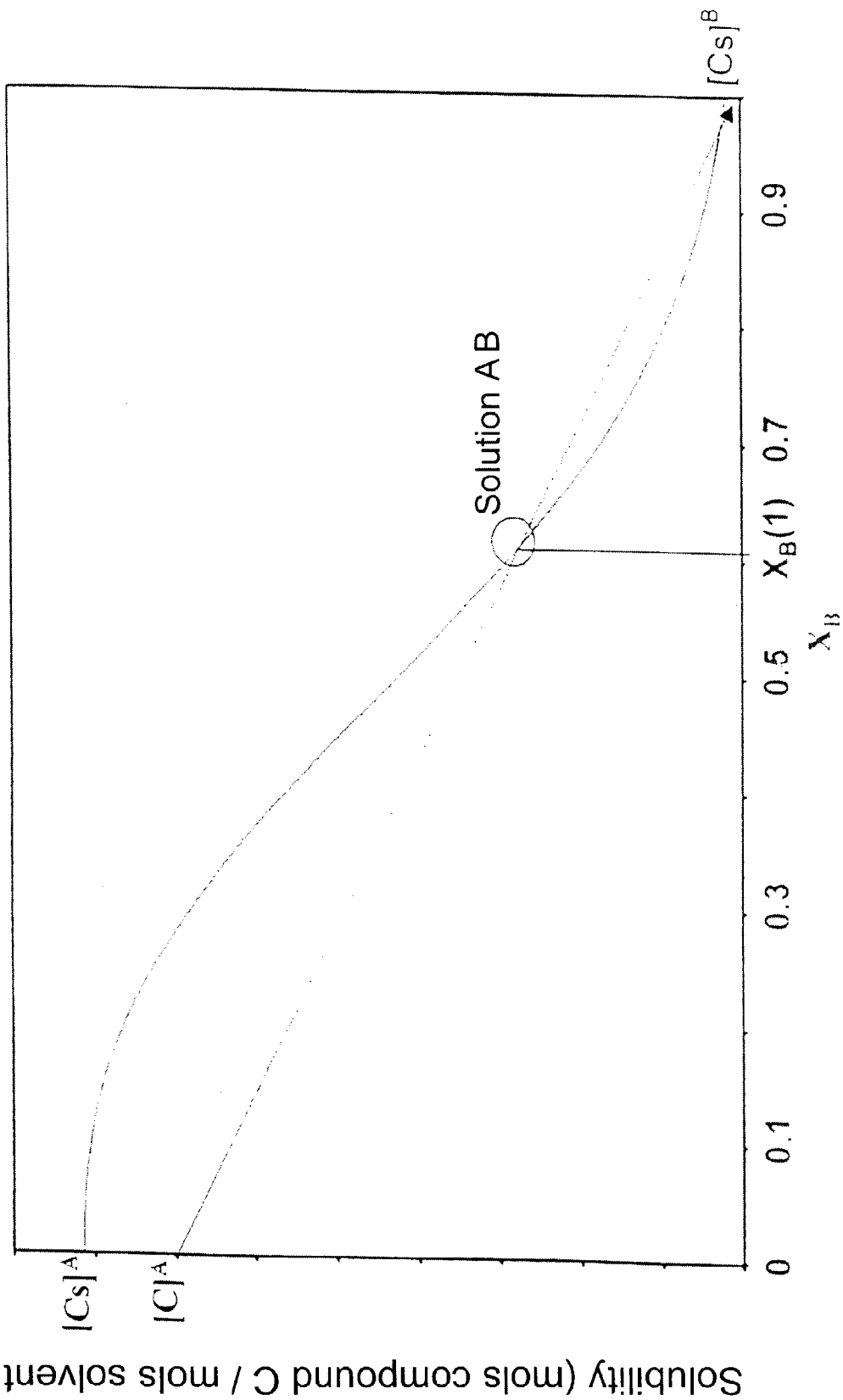
FIG. 3 shows the variation in the solubility of a compound C with the composition of the solvent (fluid A and fluid B) at a pressure P and a temperature T with values of the coefficients in accordance with equation 1 that permit the method to be carried out according to the invention.

As FIG. 3 shows, fluid B can be added to solution A (compound C in fluid A), with concentration of $[C]^A$ lower than the saturation concentration $[C_s]^A$ at temperature T, until a new solution AB of molar fraction $X_B(1)$ is formed, without precipitation by "salting out" occurring, that is, precipitation by addition of fluid B.

The rapid reduction of pressure of the new solution AB leads to a sharp fall in temperature, homogeneously throughout the solution, and this causes precipitation of the compound C. The uniform and fast reduction of temperature at all points in the solution rapidly produces considerable supersaturation, thus boosting the nucleation process as against crystalline growth and the obtaining of particles of average size of less than 10 μm and with a very narrow size distribution.

Figure 4:
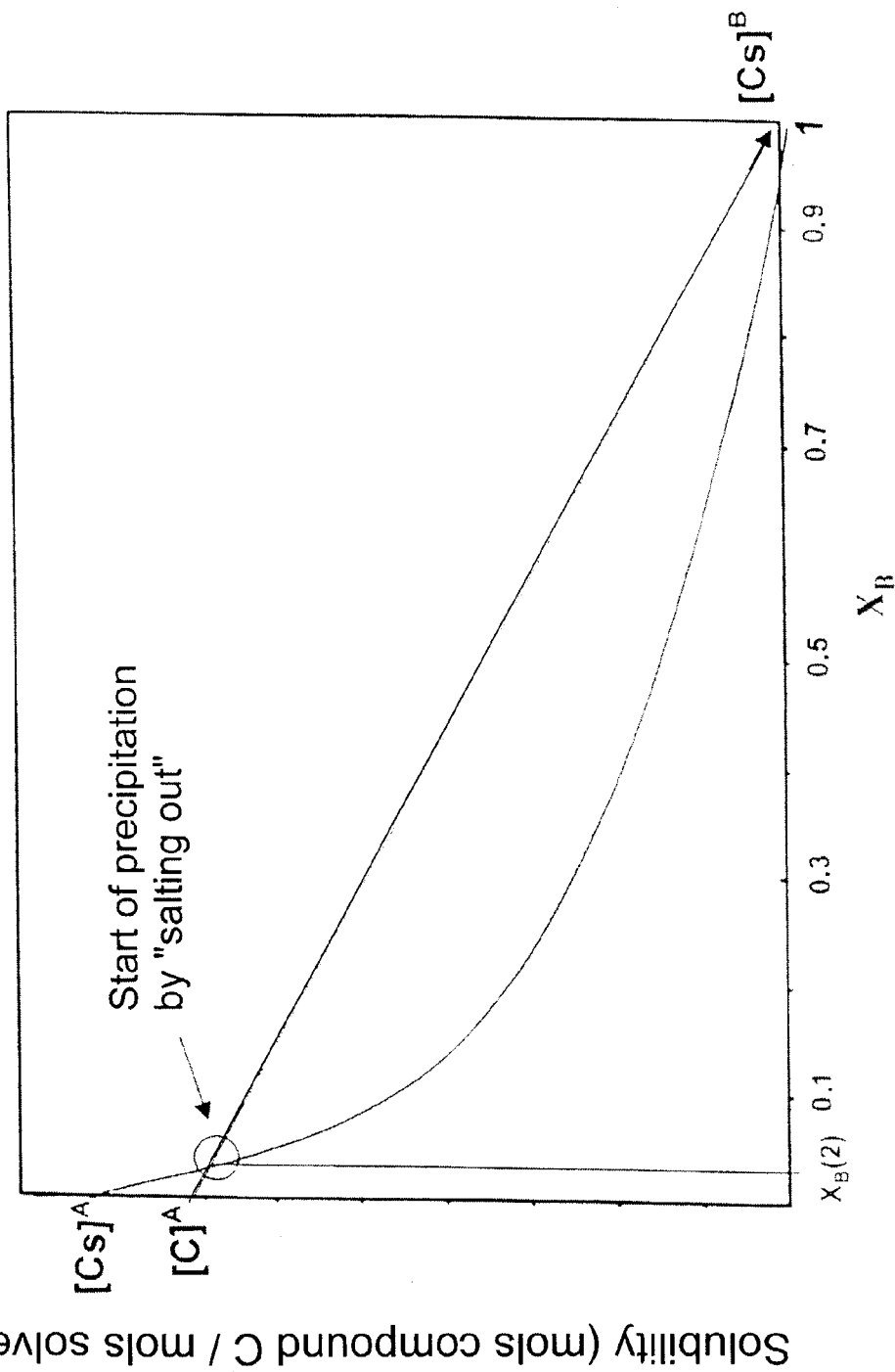
FIG. 4 shows the variation in the solubility of a compound C with the composition of the solvent at a pressure P and a temperature T with values of the coefficients in accordance with equation 1 that do not permit the method to be carried out according to the invention.

FIG. 4 shows the variation in solubility of a compound C with the solvent mixture (fluid A and fluid B) at a pressure P and temperature T, for which a method in accordance with the invention cannot be carried out.

If the variation of solubility of a compound C with the solvent mixture (fluid A and fluid B) is as shown in FIG. 4, a precipitation in accordance with the method of the invention cannot be carried out. In this case, when the fluid B is added to the initial solution A, at concentration $[C]^A$ at pressure P and temperature T, precipitation by "salting out" will occur before having mixed a sufficient quantity of fluid B with solution A in order to obtain a homogeneous solution AB.

There follows a more detailed description of the figures corresponding to the examples.

Figure 5:
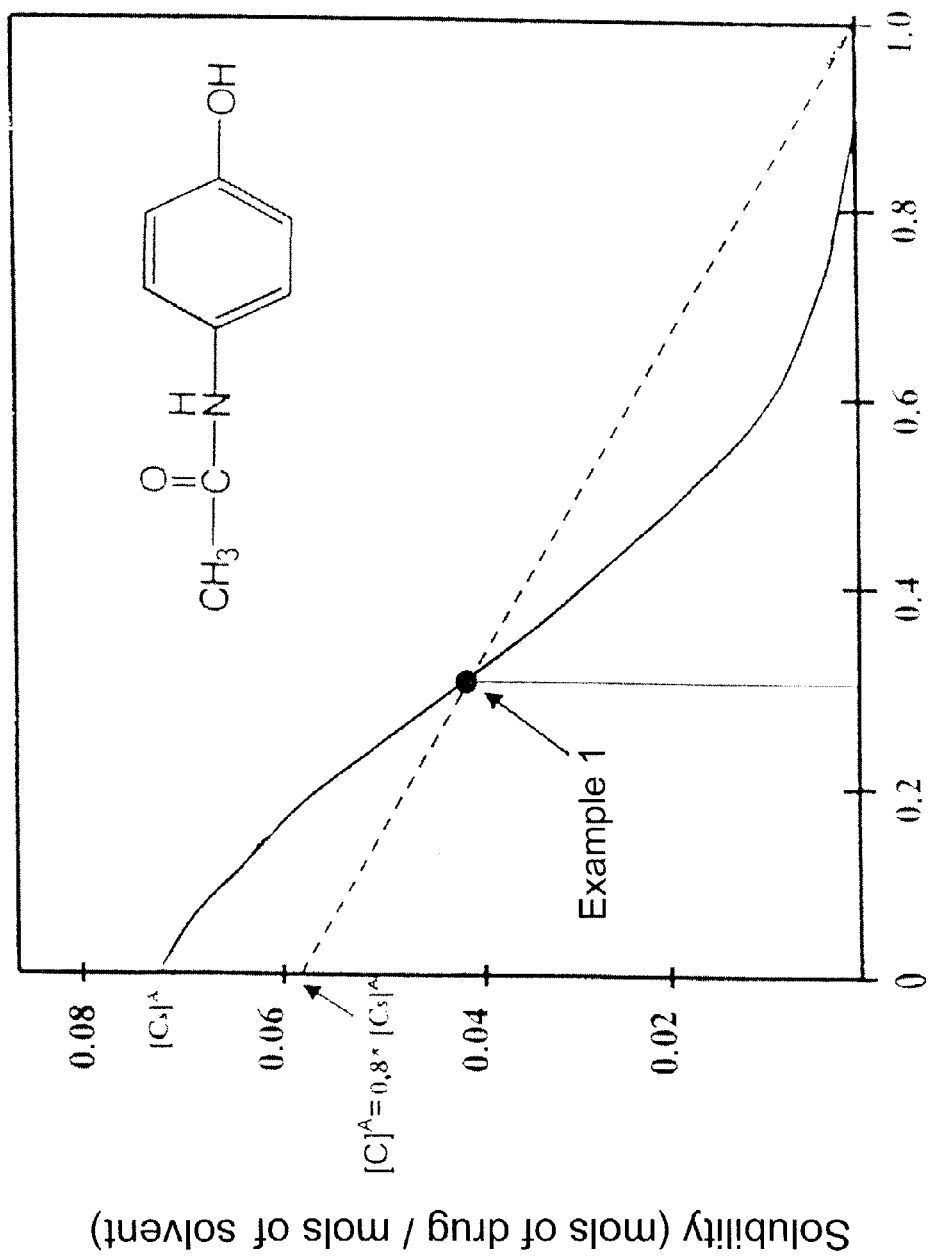

FIG. 5 shows the position of the acetaminophen-ethanol-$CO_2$ mixture at 100 bar and 42° C. immediately prior to depressurisation (stage d), of example 1 (filled-in spot), in relation to the solubility curve of the acetaminophen in ethanol-$CO_2$ mixtures at 100 bar and 42° C. When the solubility curve shown in FIG. 1 is adjusted by means of Equation 1 the following values were obtained for the coefficients: $\alpha=0.092$; $\beta=0.34$; $\gamma=-0.14$ and $\delta=1.3$.

Figure 6:
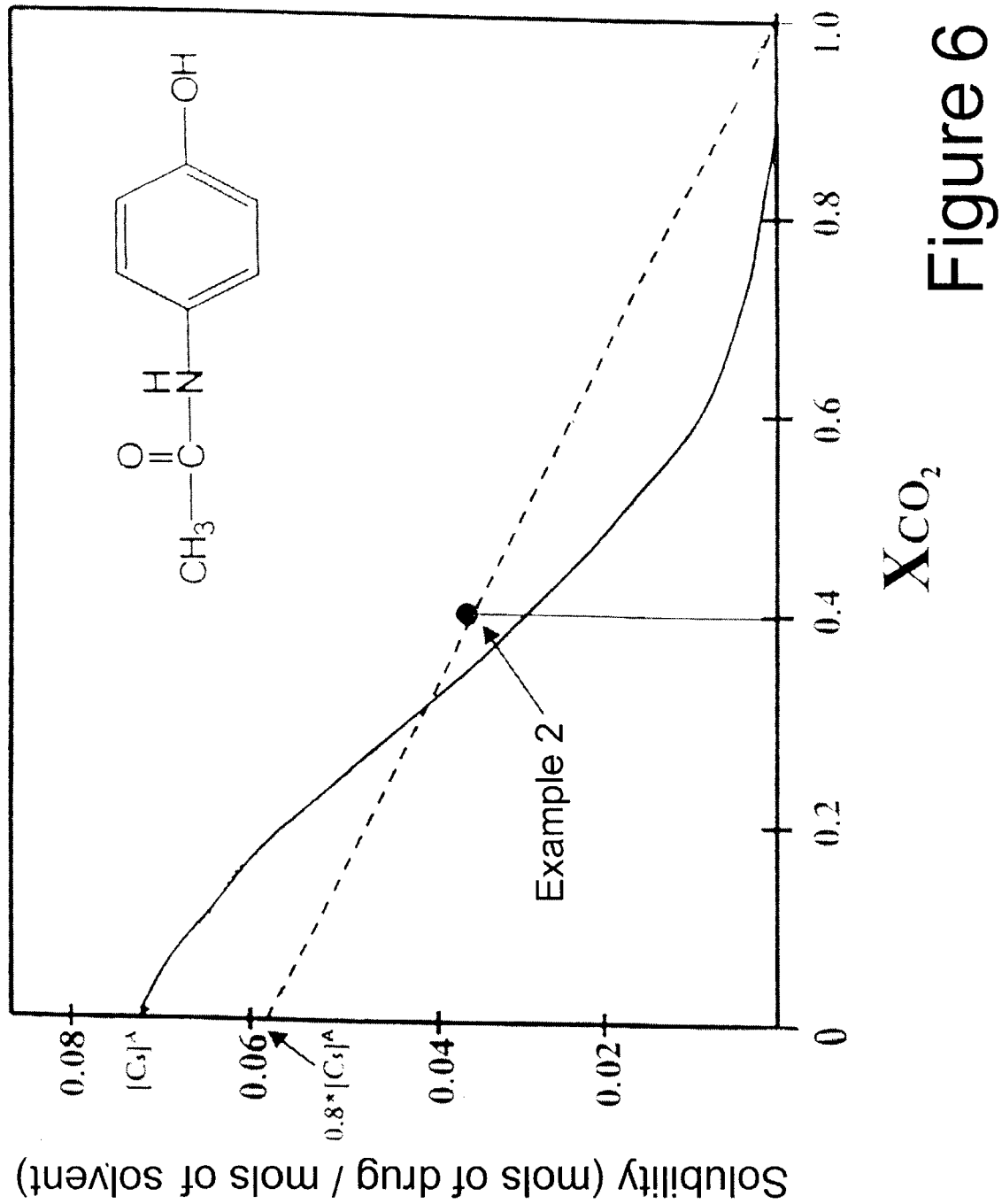

FIG. 6 shows the position of the acetaminophen-ethanol-$CO_2$ mixture at 100 bar and 42° C. immediately prior to depressurisation, of example 2, in relation to the solubility curve of the acetaminophen in ethanol-$CO_2$ mixtures at 100 bar and 42° C. When the solubility curve shown in the figure is adjusted by means of Equation 1 the following values were obtained for the coefficients: $\alpha=0.092$; $\beta=0.34$; $\gamma=-0.14$ and $\delta=1.3$.

Figure 7:
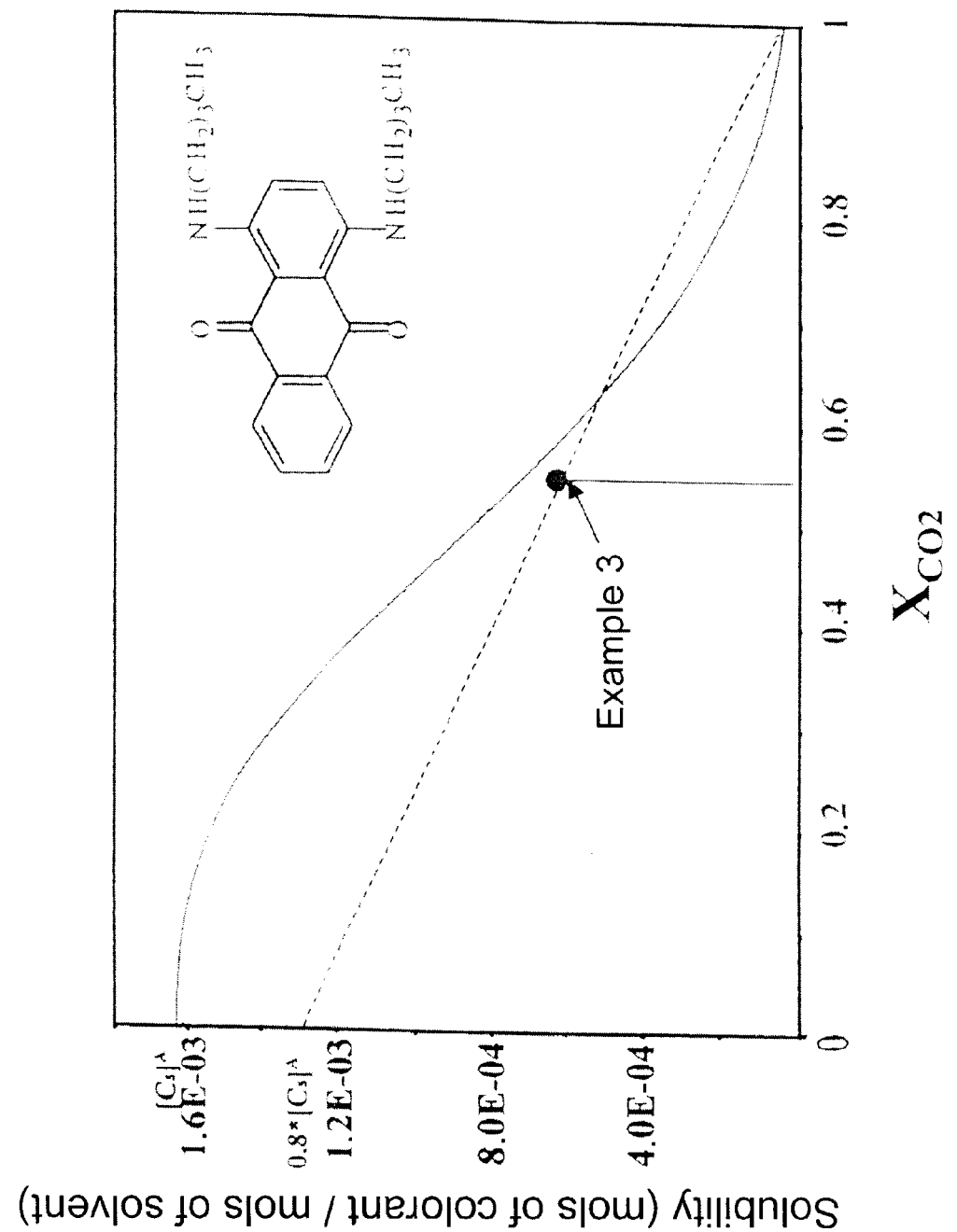

FIG. 7 shows the position of the "solvent blue 35"-acetone-$CO_2$ mixture at 60 bar and 25° C. immediately prior to depressurisation, of example 3, with respect to the solubility curve of the "solvent blue 35" in acetone-$CO_2$ mixtures at 60 bar and 25° C. When the solubility curve was adjusted to Equation 1 the following values were obtained: $\alpha=0.018$; $\beta=0.48$; $\gamma=-0.25$ and $\delta=71$.

FIG. 8 shows the analysis of particle size by the COULTER technique using light dispersion of example 3, in accordance with the method of the invention.

Figure 9:
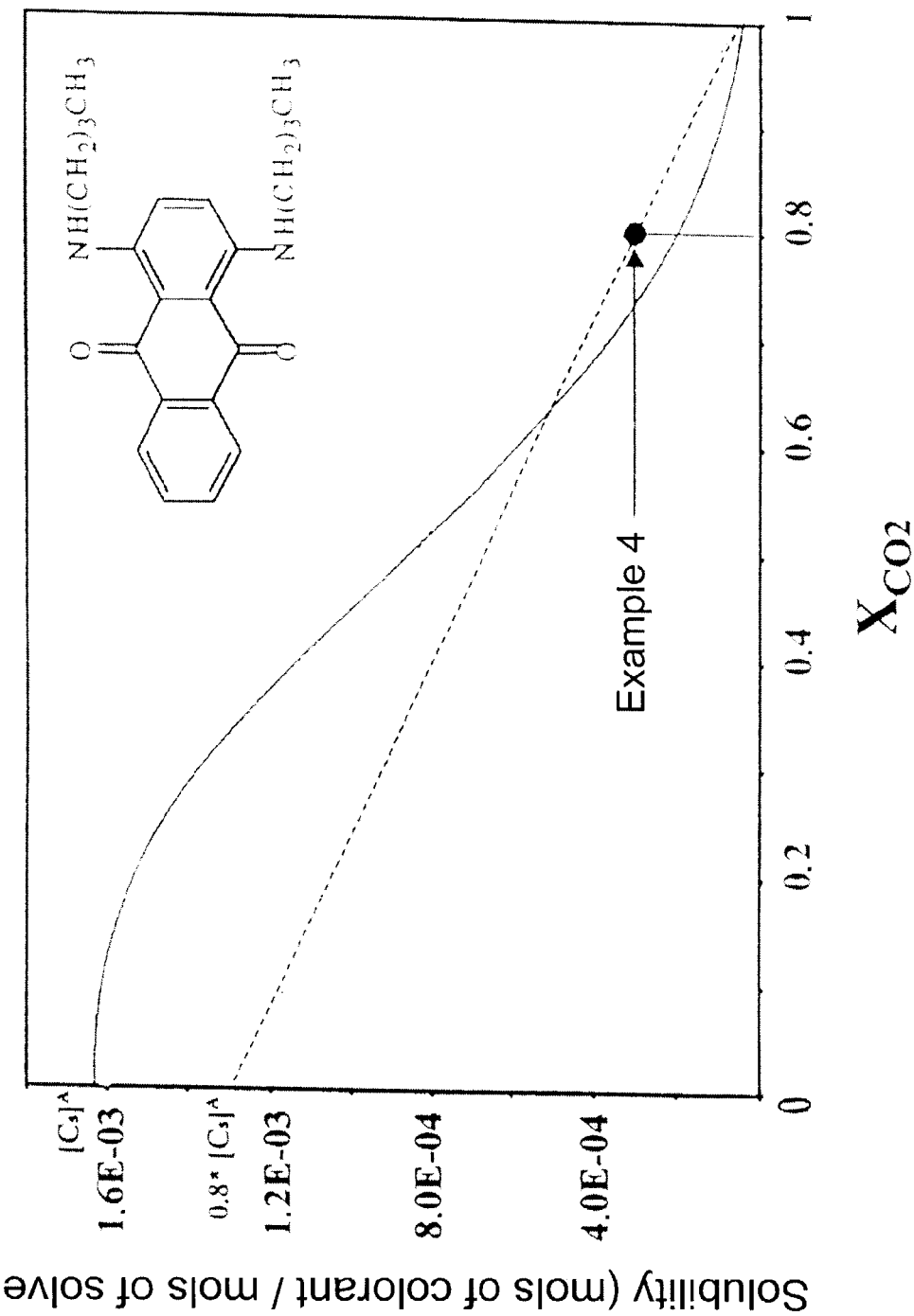

FIG. 9 shows the position of the mixture of "solvent blue 35"-acetone-$CO_2$ mixture at 60 bar and 25° C. immediately prior to depressurisation, of example 4, with respect to the solubility curve of the "solvent blue 35" in acetone-$CO_2$ mixtures at 60 bar and 25° C. When the solubility curve was adjusted to Equation 1 the following values were obtained: $\alpha=0.018$; $\beta=0.48$; $\gamma=-0.25$ and $\delta=71$.

FIG. 10 shows the analysis of particle size by the COULTER technique using light dispersion of the fraction of precipitation of particles of example 4, in accordance with the GAS procedure of the prior art.

FIG. 11 shows the analysis of particle size by the COULTER technique using light dispersion of the fraction of precipitation of particles of example 4, in accordance with the method of the invention.

Figure 12:
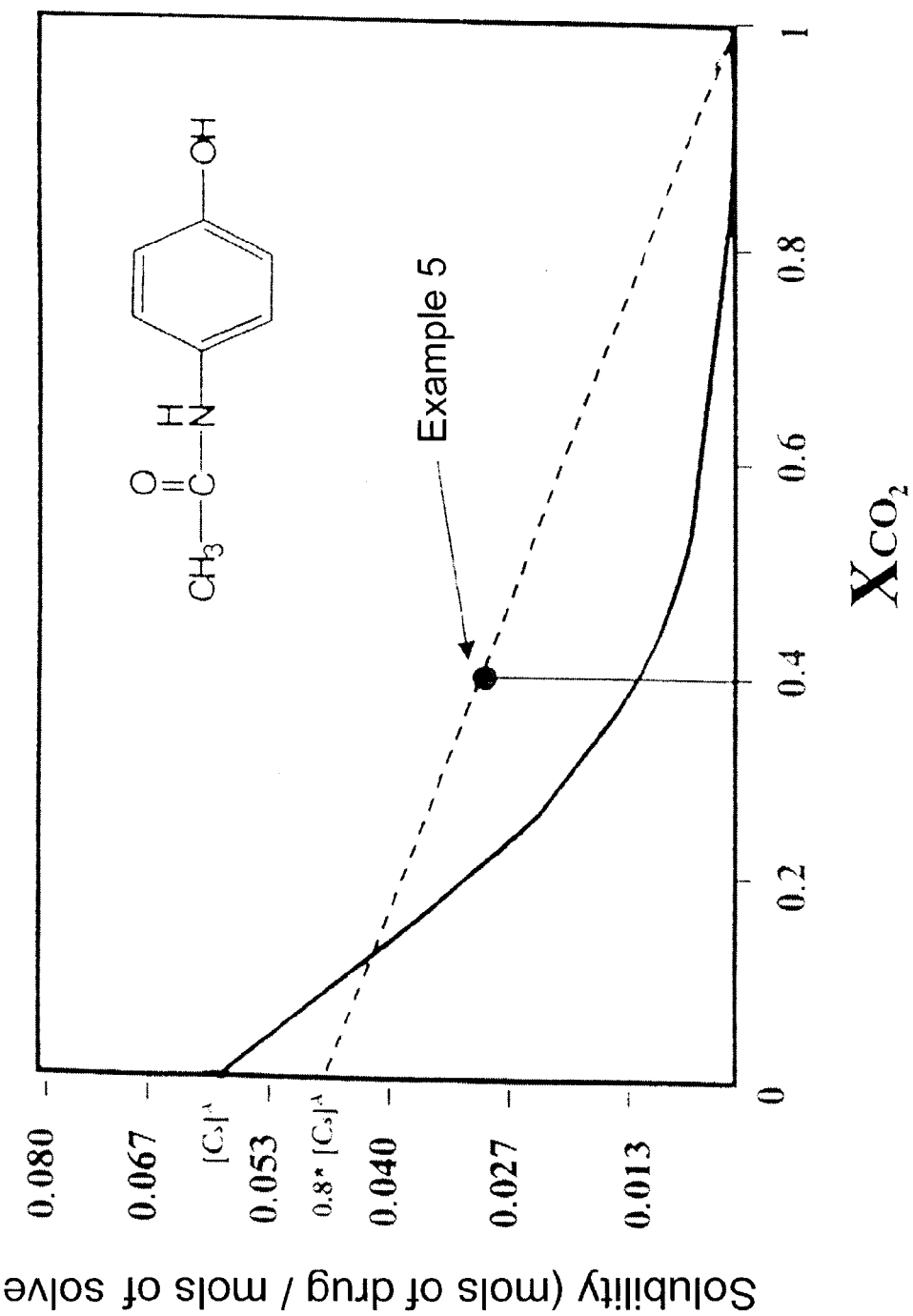

FIG. 12 shows the position of the acetaminophen-acetone-$CO_2$ mixture at 100 bar and 42° C. immediately prior to depressurisation, of example 5, in relation to the solubility curve of the acetaminophen in acetone-$CO_2$ mixtures at 100 bar and 42° C. When the solubility curve was adjusted to Equation 1 the following values were obtained for the coefficients: $\alpha=0.12$; $\beta=-0.01$; $\gamma=-0.23$ and $\delta=2.3$.

Provided below is Table 1, which gathers together all the values of the variables of equation 1 obtained in accordance with the figures pertaining to the examples of the invention.

It is advantageous if the solution AB to be depressurised is in a position close to the curve of the variation of solubility with the composition of the solvent and with values of $X_B > 0.2$.

TABLE 1

| Example no. | α | β | γ | δ |
|---|---|---|---|---|
| 1 | 0.092 | 0.34 | −0.14 | 1.3 |
| 2 | 0.092 | 0.34 | −0.14 | 1.3 |
| 3 | 0.018 | 0.48 | −0.25 | 71 |
| 4 | 0.018 | 0.48 | −0.25 | 71 |
| 5 | 0.12 | −0.01 | −0.23 | 2.3 |

PREFERRED EMBODIMENT OF THE INVENTION

There follow below details of a preferred embodiment of the method of the invention schematised in FIG. 2.

1. Introduction into the reactor of mixture 7, at a temperature T, of a certain quantity ($V_i$) of a solution A of the compound C to be precipitated, with the fluid A being water or an organic solvent of mixtures of same such as acetone, methanol, ethanol, ethyl acetate, toluene, etc.

2. Formation in the reactor 7 of a new liquid solution AB, at pressure P and temperature T, by means of addition onto solution A of a fluid B, liquid or supercritical, for example $CO_2$, ethane, propane, etc., which is a gas at atmospheric pressure and is miscible with the fluid A at pressure P. The addition of the fluid B is implemented, via the pump 3, through the lower part of the reactor 7 and keeping the valves 4 and 5 open and all the others closed. The addition ends when there is a single liquid phase in the reactor 7 at pressure P.

3. Opening of valve 10, in order to establish the same pressure P in the reactor 7 and in the filter 11.

4. Depressurisation of the solution AB and filtering of the particles precipitated: the valve 9 is opened in order to permit the entry of $N_2$ at the pressure P. The valves 4 and 5 are closed in order to cut off the supply of $CO_2$. Valve 14 is opened in order to ensure that the filter 13 is at atmospheric pressure. The valve 12 is opened gradually in order to start depressurisation of the solution AB. At the filter 11, filtering is carried out at the pressure P and any precipitate formed during the mixing of solution A with solution B is collected. At filter 13, filtering is carried out at atmospheric pressure, and the particles formed in it by the method of the invention are retained. The mother liquor is collected in the tank 15.

5. Washing of the precipitate: the valve 12, and then valve 14, are closed. The supply of $N_2$ is shut off by closing valve 9. The supply of $CO_2$ through the upper part of the reactor 7 is opened up, by opening valves 4 and 6. Valve 12 is opened gradually until the filter 13 is at the desired washing pressure P. This pressure is maintained by means of controlled opening of the valve 14. A certain flow of $CO_2$ is maintained at pressure P through the filter 11, and at pressure P1 through filter 13, in order to wash the precipitates contained in both filters.

6. Isolation of filter 13: the valve 12 is closed, the supply of $CO_2$ is cut off by the closing of valves 4 and 5, the filter 13 is depressurised through valve 14, and the filter 13 is detached from the rest of the equipment in order to be able to recover the precipitate contained in it.

7. The rest of the equipment is depressurised through valve 12.

EXAMPLES

Example 1

In the mixing reactor 7 of 2-liter capacity are placed 1,750 ml of a solution of the drug acetaminophen in ethanol with a concentration in relation to saturation of 80%. Over this solution is added $CO_2$ at a flow rate of 7 kg/h until the pressure in the reactor 7 reaches 100 bar. The temperature is kept constant at 42° C. throughout the entire process. The new acetaminophen-ethanol-$CO_2$ mixture is left to stabilize at 100 bar and 42° C. for 10 minutes (see FIG. 5). The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution homogeneously at all parts thereof occurs when valve 12 is opened, valve 14 having been opened previously. The precipitate of acetaminophen produced according to the method of the invention is collected in the filter 13 at atmospheric pressure and washed with $CO_2$ at 40 bar. The size distribution of the particles of precipitate obtained according to the method of the invention shows an average size of 15 µm, with standard deviation of 18 µm. The yield of the process is 25%.

Example 2

The presence of the filter 11 in the arrangement of the equipment used for carrying out precipitations according to the method of the invention is justified in those cases in which it is appropriate to work with compound C-fluid A-fluid B mixtures situated above the solubility curve. In such cases there is a possibility that part of the precipitation of the compound C is by GAS process (WO 9003782), and, if this is the case, it would be collected in filter 11. The presence of the filter 11 thus improves this invention, since whenever necessary, the precipitate produced by GAS process can be separated from that produced by the method of the invention.

In the mixing reactor 7 of 2-liter capacity are placed 1,600 ml of a solution of the drug acetaminophen in ethanol with a concentration in relation to saturation of 80%. Over this solution is added $CO_2$ at a flow rate of 7 kg/h until the pressure in the reactor 7 reaches 100 bar. The temperature is kept constant at 42° C. throughout the entire process. The new acetaminophen-ethanol-$CO_2$ mixture is left to stabilize at 100 bar and 42° C. for 10 minutes (see FIG. 6). The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution, equally intensely at all parts thereof, occurs when valve 12 is opened, valve 14 having been opened previously. The precipitate of acetaminophen produced by GAS process is collected in the filter 11 at 100 bar pressure. The precipitate of acetaminophen produced according to the method of the invention is collected in the filter 13 at atmospheric pressure. Both are washed with $CO_2$ at 40 bar. The size distribution of the particles of precipitate obtained by GAS process has an average size of 50 µm, with standard deviation of 30 µm The size distribution of the particles of precipitate obtained by the method of the invention has an average size of 15 µm, with standard deviation of 15 µm. The yield of the GAS process is 5%, while that of the method of the invention is 30%.

Example 3

In the mixing reactor 7 of 2-liter capacity is placed 1,400 ml of a solution of the colorant "solvent blue 35" in acetone with a concentration in relation to saturation of 80%. Over this solution is added $CO_2$ at a flow rate of 7 kg/h until the pressure in the reactor 7 reaches 60 bar. The temperature is kept constant at 25° C. throughout the entire process. The new "solvent blue 35"-acetone-$CO_2$ mixture is left to stabilize at 60 bar and 25° C. for 10 minutes (see FIG. 7). The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution, equally intensely at all parts thereof, occurs when valve 12 is opened, with valve 14 having been opened previously. The precipitate of "solvent blue 35" colorant produced by the method of the invention is collected in filter 13 at atmospheric pressure and washed with $CO_2$ at 40 bar. The distribution of precipitate particle size obtained using the method of the invention (FIG. 8) has an average of 5 µm, with standard deviation of 3 µm. The yield of the process is 80%.

Example 4

In the following example, the presence of the filter 11 is once again justified.

In the mixing reactor 7 of 2-liter capacity is placed 640 ml of a solution of the colorant "solvent blue 35" in acetone with a concentration in relation to saturation of 80%. Over this solution is added $CO_2$ at a flow rate of 7 kg/h until the pressure in the reactor 7 reaches 60 bar. The temperature is kept constant at 25° C. throughout the entire process. The new "solvent blue 35"-acetone-$CO_2$ mixture is left to stabilize at 60 bar and 25° C. for 10 minutes (see FIG. 9). The supply of $CO_2$ is shut off and addition of He through the upper part of the reactor is started through valve 6, keeping the pressure and temperature constant. Depressurisation of the solution, with resulting rapid evaporation of the $CO_2$ and sudden cooling of the solution, equally intensely at all parts thereof, occurs when valve 12 is opened, with valve 14 having been opened previously. The precipitate of "solvent blue 35" colorant produced by GAS process is collected in filter 11 at 60 bar pressure. The precipitate of colorant produced by the method of the invention is collected in filter 13 at atmospheric pressure. Both are washed with $CO_2$ at 40 bar. The distribution of precipitate particle size obtained using the GAS process (FIG. 10) has an average size of 70 µm, with standard deviation of 65 µm. The distribution of precipitate particle size obtained using the method of the invention (FIG. 11) has an average of 4 µm, with standard deviation of 6 µm. The yield of the GAS process is 5%, while that of the process of the invention is 70%.

Example 5

The following example is equivalent to Example 2 in relation to the working conditions and arrangement of the equipment, but in this case the fluid A is acetone instead of ethanol. The solubility curves of the acetaminophen-ethanol-$CO_2$ and acetaminophen-acetone-$CO_2$ systems are completely different (compare FIG. 6 and FIG. 12). This is the reason why in Example 2 precipitation is obtained by the method of the invention, while in Example 5 GAS process precipitation is obtained.

In the mixing reactor 7 of 2-liter capacity are placed 1,600 ml of a solution of the drug acetaminophen in acetone with a concentration in relation to saturation of 80%. Over this solution is added $CO_2$ at a flow rate of 7 kg/h until the pressure in the reactor 7 reaches 100 bar. The temperature is kept constant at 42° C. throughout the entire process. The new acetaminophen-acetone-$CO_2$ mixture is left to stabilize at 100 bar and 42° C. for 10 minutes (see FIG. 12). The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution, homogeneously at all parts thereof, occurs when valve 12 is opened, valve 14 having been opened previously. The precipitate of the acetaminophen produced by GAS process is collected in the filter 11 at 100 bar pressure and is washed with $CO_2$ at 40 bar. Precipitate produced by the method of the invention is not collected in filter 13. The size distribution of the particles of precipitate obtained by GAS process shows an average size of 50 μm, with standard deviation of 39 μm. The yield of the GAS process is 60%.

Example 6

In the mixing reactor 7 of 2-liter capacity are placed 1,350 ml of a solution of the drug "aspirin" in acetone with a concentration in relation to saturation of 60%. Over this solution is added $CO_2$ at a flow rate of 7 kg/h until the pressure in the reactor 7 reaches 70 bar. The temperature is kept constant at 25° C. throughout the entire process. The new "aspirin"-acetone-$CO_2$ mixture, with a molar fraction of $CO_2$ of 0.6, is left to stabilize at 70 bar and 25° C. for 10 minutes. The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution, at equal intensity in at all parts thereof, occurs when valve 12 is opened, valve 14 having been opened previously. The precipitate of the medicine "aspirin" produced by method of the invention is collected in the filter 13 at atmospheric pressure and is washed with $CO_2$ at 40 bar. The size distribution of the particles of precipitate obtained by the method of the invention shows an average size of 14 μm, with standard deviation of 15 μm. The yield of the process is 40%.

Example 7

In the mixing reactor 7 of 2-liter capacity are placed 1,300 ml of a solution of the organic compound "stearic acid" in ethyl acetate with a concentration in relation to saturation of 80%. Over this solution is added $CO_2$ at a flow rate of 7 kg/h until the pressure in the reactor 7 reaches 100 bar. The temperature is kept constant at 25° C. throughout the entire process. The new "stearic acid"-ethyl acetate-$CO_2$ mixture, with a molar fraction of $CO_2$ of 0.6, is left to stabilize at 100 bar and 25° C. for 10 minutes. The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution, at equal intensity in at all parts thereof, occurs when valve 12 is opened, valve 14 having been opened previously. The precipitate of stearic acid produced by method of the invention is collected in the filter 13 at atmospheric pressure and is washed with $CO_2$ at 40 bar. The size distribution of the particles of precipitate obtained by the method of the invention shows an average size of 2 μm, with standard deviation of 2 μm. The yield of the process is 70%.

Example 8

In the mixing reactor 7 of 2-liter capacity are placed 900 ml of a solution of the organic compound "methenamine" in ethanol with a concentration in relation to saturation of 90%. Over this solution is added $CO_2$ at a flow rate of 7 kg/h until the pressure in the reactor 7 reaches 100 bar. The temperature is kept constant at 25° C. throughout the entire process. The new "methenamine"-ethanol-$CO_2$ mixture, with a molar fraction of $CO_2$ of 0.7, is left to stabilize at 100 bar and 25° C. for 10 minutes. The supply of $CO_2$ is shut off and addition of $N_2$ through the upper part of the reactor is started through valve 6, keeping the pressure and temperature constant. Depressurisation of the solution, with resulting rapid evaporation of the $CO_2$ and sudden cooling of the solution, at equal intensity in at all parts thereof, occurs when valve 12 is opened, valve 14 having been opened previously. The precipitate of "methenamine" produced by method of the invention is collected in the filter 13 at atmospheric pressure and is washed with $CO_2$ at 40 bar. The size distribution of the particles of precipitate obtained by the method of the invention shows an average size of 8 μm, with standard deviation of 10 μm. The yield of the process is 60%.

The invention claimed is:

1. Method for obtaining finely divided solid particles which comprises:
 a) Dissolving a compound C in a fluid A in order to provide a solution A;
 b) Thermostatization of said solution A at a temperature T ranging between −50° C. and 200° C.;
 c) Adding a fluid B to said solution A until a pressure P is obtained, characterized in that said fluid B at pressure P and temperature T is miscible with said solution A and acts as a co-solvent in forming a solution AB;
 d) Adding an inert gas to solution AB so as to maintain the pressure P, and
 e) Reducing the pressure of said solution AB so as to produce the precipitation of said compound C in the form of a finely divided solid particle;
 wherein compound C is selected from the group consisting of drugs, explosives, colorants, pigments, cosmetics, polymers, catalysts, and chemical products for agriculture;
 wherein fluid A is selected from the group consisting of polar solvents and non-polar solvents;
 wherein fluid B is selected from the group consisting of liquids and supercritical fluids, which behave as a liquid at said pressure P and temperature T, and as a gas at the discharge pressure and temperature, and are miscible with said fluid A and said solution A or only with said solution A at said pressure P and temperature T; and wherein said inert gas is any gas, other than said fluid A and fluid B, that does not interfere with the solubility of compound C in fluid A and fluid B or modify their chemical composition.

2. Method as claimed in claim 1, in which said inert gas is selected from the group consisting of nitrogen, helium and argon.

3. Method as claimed in claim 1, characterized in that the solubility response of said compound C in the solvent, fluid A and fluid B, at pressure P and temperature T, approximates to a mathematical function of "asymmetric sigmoid" type, which is shown below:

$$S = \frac{\alpha}{\left[1 + \exp\left[-\frac{X_B - \gamma \ln(2^{1/\delta} - 1) - \beta}{\gamma}\right]\right]^{\delta}} \quad \text{Equation 1}$$

In which:

S is the solubility of the compound C, expressed in moles of C per moles of solvent;

$X_B$ is the molar fraction of fluid B in the solvent, at a pressure P and a temperature T, and $\beta > 0.01$, $|\gamma| > 0$ and $\alpha \approx ([C_s]^A - [C_s]^B)$, with $[C_s]^A$ being the saturation concentration of the compound C in the fluid A and $[C_s]^B$ being the saturation concentration of the compound C in the fluid B, independently of the value of $\delta$.

4. Method as claimed in claim 3, characterized in that $\beta > 0.3$.

5. Method as claimed in claim 3, characterized in that $|\gamma| < 0.3$.

6. Method as claimed in claim 1, in which the finely divided solid particles have an average particle diameter of less than 20 μm and a size distribution ranging between 1 and 100 μm.

7. Method as claimed in claim 6, in which the finely divided solid particles have an average particle diameter of less than 10 μm and a size distribution ranging between 1 and 20 μm.

8. Method as claimed in claim 1, characterized in that said fluid B is added to said solution A continuously at pressure P to obtain solution AB.

9. Method as claimed in claim 1, where said fluid A is water, an organic solvent, or mixtures thereof.

10. Method as claimed in claim 9, where said fluid A is water, acetone, methanol, ethanol, ethyl acetate, toluene or mixtures thereof.

* * * * *

UNITED STATES PATENT AND TRADEMARK OFFICE
CERTIFICATE OF CORRECTION

PATENT NO. : 7,291,295 B2 Page 1 of 1
APPLICATION NO. : 10/111501
DATED : November 6, 2007
INVENTOR(S) : Ventosa Rull et al.

It is certified that error appears in the above-identified patent and that said Letters Patent is hereby corrected as shown below:

Title page, item (75), "Nora Ventosa Rull, Bellaterra (ES); Jaume Veciana Miro, Bellaterra (ES); Concepción Rovira Angulo, Bellaterra (ES); Santiago Sala Verges, Bellaterra (ES)" should read --Nora Ventosa Rull, Bellaterra-Barcelona (ES); Jaume Veciana Miro, Bellaterra-Barcelona (ES); Concepció Rovira Angulo, Bellaterra-Barcelona (ES); Santiago Sala Verges, Bellaterra-Barcelona (ES)--.

Title page, item (57), line 6, "-50º0 C." should read -- -50º C.--.

Claim 3, column 14, line 1, "$[C_S]^A$" should read --$[C_S]^A$--.

Signed and Sealed this

Seventeenth Day of June, 2008

JON W. DUDAS
*Director of the United States Patent and Trademark Office*